May 24, 1966 P. O. BERG 3,252,630
METHOD AND APPARATUS FOR UNLOADING STORAGE BINS
Filed Jan. 28, 1964 2 Sheets-Sheet 2
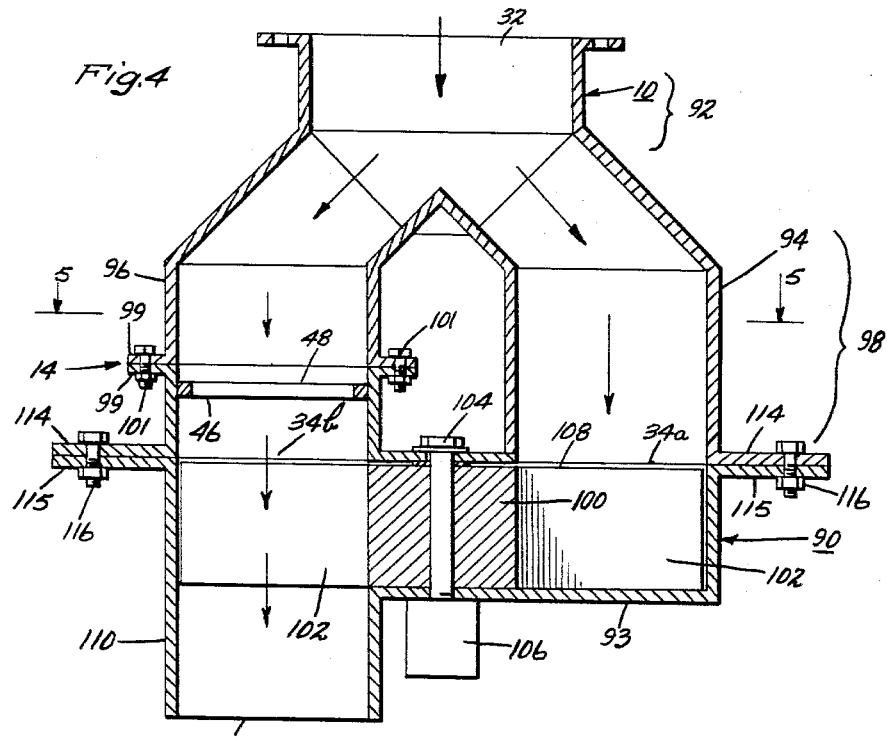
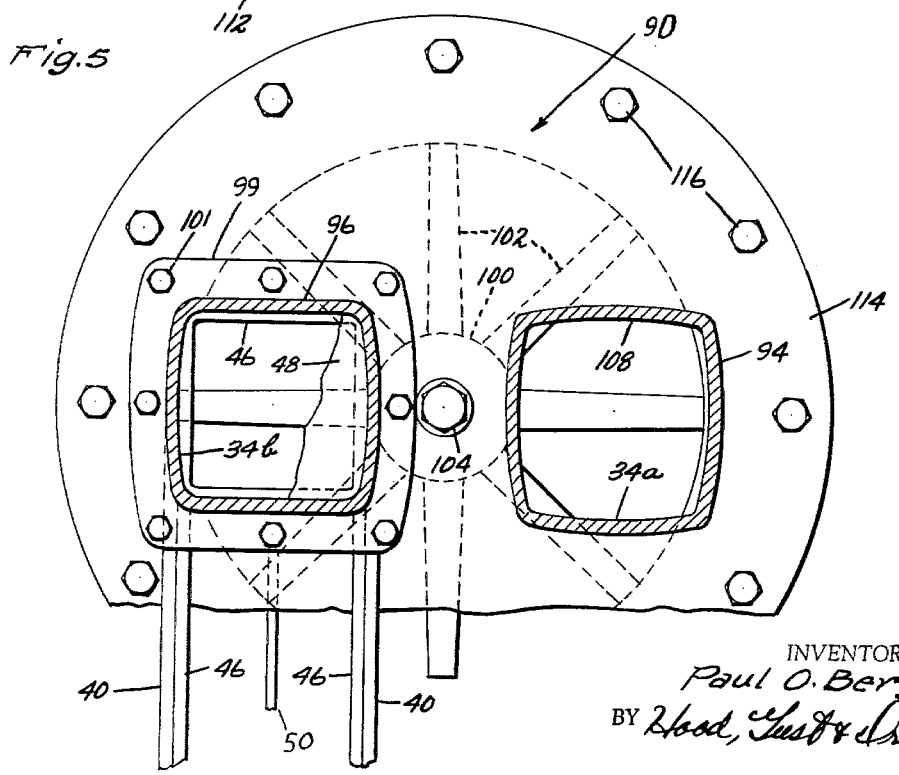
INVENTOR.
Paul O. Berg,
BY Hood, Gust & Irish
Attorneys.

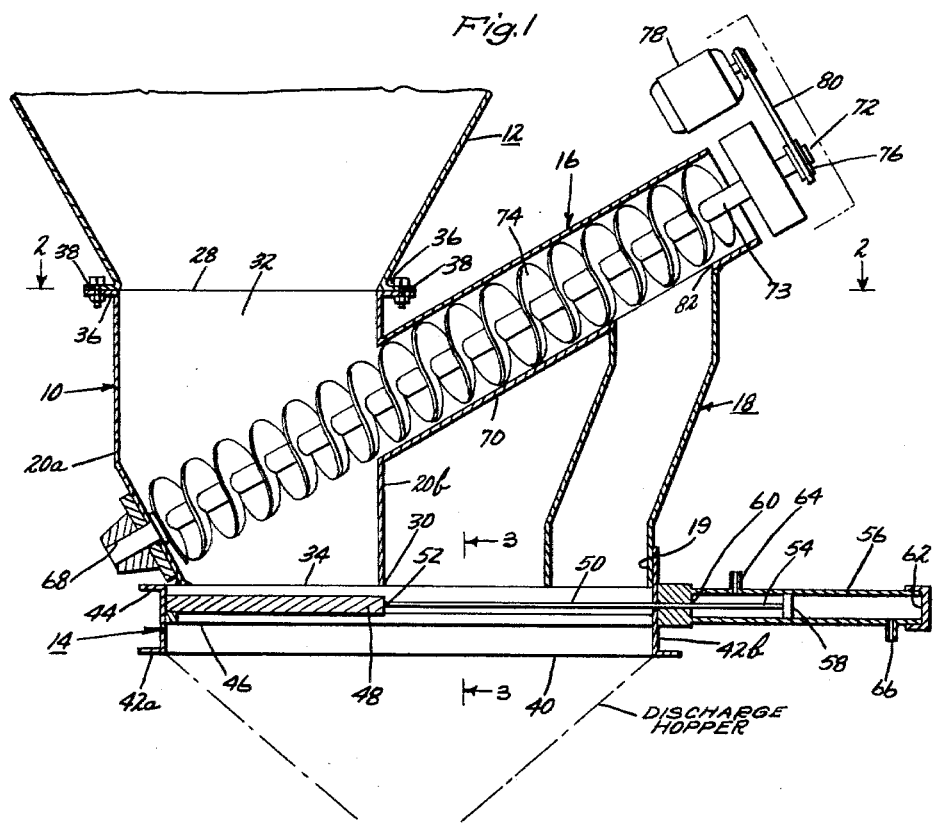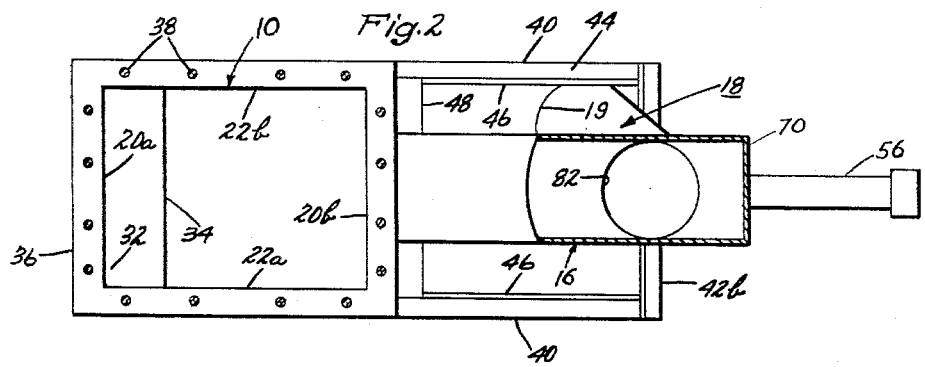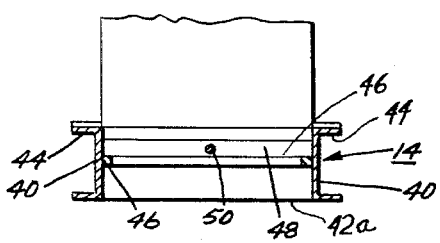

United States Patent Office 3,252,630
Patented May 24, 1966

3,252,630
METHOD AND APPARATUS FOR UNLOADING STORAGE BINS
Paul O. Berg, 2217 Indian Village Blvd., Fort Wayne, Ind.
Filed Jan. 28, 1964, Ser. No. 340,628
8 Claims. (Cl. 222—331)

This invention relates generally to devices for unloading storage bins, and more specifically to a class of devices for controllably discharging a predetermined weight or amount of material from such bin.

Bin unloading devices that accurately discharge a predetermined amount of material are widely used in industry in a variety of applications. Batch proportioning systems that automatically measure out the raw materials in conformity with a predetermined formula necessarily must have such bin unloading devices as a major component of the system. The automated loading of a chemical reactor, the automated mixing of cement, and the automated mixing of livestock feed are token examples of the widely diverse uses to which batch proportioning systems are applied. Another wide use of such unloading devices is the loading of cargo carriers. The basing of rates by cargo carriers, taxes by states, and even overload penalties by states on the axle load of the cargo carrier are now commonplace. Therefore, large volume shippers are accurately determining either the weight or volume to which each cargo carrier is loaded to optimately control shipping costs. Still further, whenever a bagged or packaged, consumer or industrial product is sold in large quantities, devices for controllably discharging storage bins or hoppers, in combination with a weighing apparatus, are used to eliminate the human element from the packaging production line.

Various types of controllable discharge devices have been proposed for use with storage bins, the most common of which is the slidable gate or plate which can completely cover the discharge opening of the storage bin, thereby preventing flow therefrom, or alternatively can be adjusted to close partially the discharge opening to provide a flow rate less than the unrestricted flow rate when desired. Such slidably mounted gates, however, commonly have poor control over the low flow rate range. This poor control is caused by the pulsating or non-steady flow of most materials from storage bins or hoppers resulting from bridging across the discharge opening. The general result of using slidably mounted gates for actively discharging a predetermined amount from storage bins has been unsatisfactory. Another commonly used discharge device is the vane feeder of which there are many types. All vane feeders, however, have a "multi-vane" wheel which resembles a gear with many teeth; the wheel rotates on a central axis moving the grain by means of its vanes one hundred eighty degrees from an entrance leading from the discharge opening onto the wheel to an exit opening discharging from below the wheel. Attached to a non-bridging type of storage bin or hopper, a vane feeder produces a steady and continuous discharge flow that does not have the inherent control problems experienced with the slide gate mechanism, however, the capacity of a vane feeder is limited by the r.p.m. at which the "vaned wheel" can rotate and the size of the chambers between the vanes. While on one hand, the size of the chambers between the vanes have to be small enough so that at the minimum r.p.m. the required size of measured flow is achieved, the size of the chambers have to be large enough to discharge the bin at a fast rate when no measurement or fine control is needed. On the other hand, most vane feeders, as they are designed for controllably discharging storage bins and hoppers, cannot provide for a discharge rate that is fast enough for many purposes. This is especially true when relatively large amounts must be measured to relatively high degree of precision; for this type of service, vane feeders have proven to be very unsatisfactory. While various other types of bin unloaders have been proposed including various types of conveyors, most of them suffer defects common to the slide gate or vane feeder in that the feeders either provide a high discharge rate relatively uncontrolled or a relatively slow, continuous and highly measurable rate. To the best of the present applicant's knowledge, none of the heretofore proposed bin unloading devices provide a high rate of discharge that is measurable to a high degree of accuracy. It is therefore desirable to provide a bin unloading device that has a high rate of discharge which can be controlled so as to produce a predetermined total weight or volume of discharge to a high degree of accuracy.

It is therefore an object of this invention to provide an improved storage bin discharging device.

Another object of this invention is to provide an improved device for controllably discharging a storage bin to a predetermined weight or volume to a high degree of accuracy.

Still another object of this invention is to provide an improved device for discharging relatively large amounts of material to a predetermined total volume or weight to a high degree of accuracy from a storage bin.

A further object of this invention is to provide an improved method for discharging a storage bin whereby relatively large measured amounts of material may be discharged in a relatively short period of time.

Further objects and advantages of this invention will become apparent by reference to the following description and the accompanying drawings, and the features of novelty which characterize the invention will be pointed out with particularity in the claims annexed to and forming a part of this specification.

The invention in its broader aspects provides a bin unloading device comprising a chute depending from the bin-discharge opening, a valve means operatively connected to the chute being movable from a first no-flow position to a second unrestricted flow position through a plurality of intermediate controlled flow positions, a conveyor means communicating with the bin and bypassing the valve means providing a steady, continuous, and measured discharge flow from the bin. The invention thus comprises two discharge means operatively connected and used in combination with each other for rapidly discharging sizable volumes and weights of material from bins with a high degree of accuracy within a short period of time.

In the drawings:

FIG. 1 is a side elevation partially shown in cross-section illustrating the improved bin unloading device of this invention utilizing a conventional screw conveyor;

FIG. 2 is a view, partially shown in cross-section, of the embodiment of the improved unloading device of FIG. 1 taken along the section line 2—2 of FIG. 1 with the screw removed for clarity;

FIG. 3 is a fragmentary view, partially shown in section, of the embodiment of FIG. 1 of the improved bin unloading device of this invention taken substantially along the section line 3—3 of FIG. 1;

FIG. 4 is a side elevation, partially shown in section, of another embodiment of this invention incorporating a conventional vane feeder; and FIG. 5 is a view, partially shown in cross-section, of the embodiment of FIG. 4 taken along the section line 5—5 of FIG. 4.

Referring now to FIGS. 1, 2 and 3 of the drawings, there is shown at 10 a gravity flow chute depending from the bottom of a conventional storage bin 12, a slide gate mechanism, generally indicated by the numeral 14, beneath the chute 10, each being fabricated of sheet metal, plastic, or the like. Communicating with the interior of chute 10 is a conventional screw conveyor 16 which in turn communicates with a conduit 18 that discharges adjacent to chute 10, thereby providing a bypass of gate mechanism 14.

Chute or spout 10 is formed of four substantially rectangular and upright side or wall portions 20a, 20b, 22a and 22b joined in edge-to-edge relationship to form a conduit having a generally rectangular horizontal cross-section and upper and lower ends 28 and 30, respectively, each having substantially rectangular openings 32 and 34 therein, respectively. The lower portion of side 20a is bent inwardly as shown in FIG. 1 to provide an inclined surface upon which conveyor 16 can be appropriately mounted.

Chute 10 is secured to the bottom of bin 12 with the inlet opening 32 aligned with the discharge opening of bin 12, thereby providing communication between the interior of bin 12 and the interior of chute 10. Inlet opening 32 is chosen in size to be coextensive with the discharge opening of the bin 12. Securing chute 10 to bin 12 may be achieved by various means, one of which is by two annular flanges 36 secured to bin 12 and chute 10, respectively, and held together by bolts 38.

Slide gate mechanism 14 comprises a pair of longitudinally extending channel members 40 which extend parallel to each other and parallel to side portions 22a and 22b for a distance of at least twice the dimension of opening 34 of chute 10 measured in the longitudinal direction of opening 34. Two channel members 42a and 42b connect the ends of channel members 40 forming a rectangular frame. Channel members 40, 42a and 42b have substantially identical lateral dimensions. Channel members 40 and 42a, 42b have their flanges 44 extending outwardly. Elongated gate bars 46 are attached to the inside facing surface of the channel members and extend parallel to the upper flanges 44. A slide gate or plate 48, made of sheet material is slidably positioned on guide bars 46 so to be freely slidable horizontally. A bar 50 is connected at one end 52 to slide gate 48 and at the other end 54 to the piston rod of a conventional, double-acting fluid power cylinder 56. Slide gate mechanism 14 is secured to the under side of chute 10 in alignment with opening 34. The upper flanges 44 of channels 40 and 42a are secured to the under side of chute 10 adjacent to the periphery of opening 34 by welding or other suitable means. Gate mechanism 14 being so secured to chute 10 positions guide bars 46 in close proximity to but slightly spaced from the opening 34 thereby providing a space for receiving slide gate 48 between guiding bars 46 and the chute 10 to close opening 34. Cylinder 56 is secured to channel 42b and extends outwardly in horizontal and central alignment with respect to opening 34. Piston 58 can be reciprocated between the cylinder ends 60 and 62, respectively, for sliding gate 48 into and out of registry with opening 34. When slide gate 48 closes opening 34 of chute 10, piston 58 is adjacent to end 60 of cylinder 56. An air inlet and discharge conduit 64 is located between piston 58 and end 60 and communicates with the interior of air cylinder 56. By forcing air into air cylinder 56 by means of conduit 64, piston 58 is urged toward end 62, thereby removing slide gate 48 from its closed position and thereby uncovering a portion of the opening 34. As piston 58 is urged toward end 62, air is discharged through a conduit 66 which communicates with the interior of air cylinder 56 adjacent to end 62. To close slide gate 48, air under pressure is similarly applied to the piston 58 via a conduit 66 thereby forcing piston 58 toward end 60 and exhausting air through conduit 64.

A standard screw conveyor 16 having a bearing end 68, a tubular housing or casing 70, a power driven end 72 and helical screw conveyor or helicoid 74 is secured to chute 10 in angular disposition to side portions 20a and 20b. Bearing end 68 is secured to the lower portion of wall 20a that is bent inwardly; the angle at which wall portion 20a is bent inwardly determines the angle of inclination at which conveyor 16 is positioned. Conveyor 16 extends across the longitudinal dimension of chute 10 and penetrates the wall 20b to extend therebeyond as shown. The precise distance that conveyor 16 extends beyond wall 20b depends upon the conveyor used. Likewise, the angle at which conveyor 16 is mounted in respect to wall portions 20a and 20b (therefore the angle at which wall portion 20a is bent) is determined by the angle at which the specific conveyor most desirably operates. The casing 70 which surrounds the screw conveyor is secured at its lower end to the wall 20b as shown. The contents of bin 12 can flow past the screw 74 and through the opening 34 upon the opening of the gate 48 by reason of the clearance provided between the walls 22a, 22b and the screw 74. At conveyor end 72 there is secured to the shaft 73 of screw 74 a pulley 76 which is rotatively driven by a motor 78 and belt 80. Adjacent to end 72 is a circular opening 82 in the under side of casing 70 which faces the channel members 40 and is positioned beneath the termination of the helical screw 74, thereby providing a discharge opening for conveyor 16. Conduit 18 is secured to casing 70 in registration with opening 82 and depends to a location within frame 40, 42a and 42b which positions the lower end 19 thereof to one side of bar 50 and rearwardly of the chute opening 34 as shown more clearly in FIG. 2.

In a specific embodiment, the dimensions of chute 10 and the slide gate mechanism 14 depend on the size of the bin 12, the screw conveyor 16 and the air cylinder 56, each of which are conventional items available in different sizes, shapes and capacities.

In operation, this invention makes possible the rapid discharge of a highly accurate, measured weight or volume of material from bin 12. This is achieved by the unique combination of a rapid discharge mechanism and a relatively slow continuous and measurable discharge mechanism of this invention. Whenever bin 12 is loaded, the contents thereof completely fill flow chute 10 between the slide gate 48 and the bin 12. By forcing fluid into fluid cylinder 56 by means of conduit 64 (as above mentioned), the fluid urges piston 58 toward end 62 and at the same time horizontally slides a portion of gate 48 out of registry with opening 34 allowing the contents of bin 10 to gravitate therethrough. By the controlled use of cylinder 56, slide gate 48 may be either horizontally slid totally out of registry with opening 34 to a fully opened and maximum flow position, or be positioned at any one of many intermediate, controlled flow positions located between the fully closed and fully open positions. Slide gate mechanism 14 as described, permits the discharge of bin 12 through opening 34 at a rate similar to discharge rates of conventional bins such as bin 12.

For the purpose of varying gravitational flow through chute 10, the degree of opening of gate 48 may be controlled. When half open, the gate 48 would permit something less than full flow to occur. For smaller flows, the gate is closed a corresponding amount.

Screw conveyor 16 thereupon becomes the sole method of discharge of the contents of bin 12 when gate 48 is completely closed. Screw conveyor 16 has the advantage over the slide gate mechanism 14 for discharging bin 12 at relatively low rates for various reasons. First, the rotary action of helix 74 of screw conveyor 16 tends to impart some motion to the contents of chute 10. Further, as screw conveyor 16 discharges the contents of bin 10 in a continuous, steady and metered flow out of chute 10, the flow is easily measured. Still further, the rate of flow by means of screw conveyor 16 can easily be controlled down to a very low flow merely by controlling the speed of revolution of the helix 74.

Therefore, it can be seen that this invention can be used in various ways to discharge a measurable portion from a standard storage bin such as bin 12. First, discharge may be initially achieved solely by discharge through opening 34 controlling such discharge by means of slide gate mechanism 14. As the desired amount of discharge is approached, slide gate 48 is continuously moved into a controlled flow position that results in a slower flow rate and finally the gate is closed. Helix 74 of screw conveyor 16 is now rotated thereby providing a smaller controlled flow which is discharged through spout 18. The contents of the bin are lifted toward end 72 of screw conveyor 16 to be dumped into conduit 18 and discharged adjacent to opening 34 of chute 10. As the desired measurement is approached, the rate of flow from screw conveyor 16 through conduit 18 may be reduced. This is achieved by merely slowing down the rate of rotation of the helix 74 of the screw conveyor 16. Helix 74 can be slowed to achieve relatively small rates of flow with most materials. For most materials, the desired measurement can be approached quite slowly and conveyor 16 may be stopped at the precise moment. Conveyor 16 may also be operated at full speed and then stopped when the desired quantity of material has been dispensed.

The screw can be operated, if desired, during the time that flow is being conducted through chute 10 (gate 48 opened), and this in some instances is beneficial because of the continuous agitation produced by the screw.

It is within the scope of this invention to provide a scale mechanism upon which a container into which the contents of bin 12 are to be discharged is placed and by which the desired measurement is to be determined. It is also contemplated that such a scale mechanism will control the operation of cylinder 56 and the motor 78 of the screw conveyor 16. This scale mechanism responds to flow from chute 10 for activating the cylinder 56 to close slide gate 48 and to start screw conveyor 16. Further, the scale may be utilized for the purpose of slowing down the rotation of helix 74 as the desired measurement is approached and finally shutting "off" screw conveyor 16. Whether the operation of this invention is automatic or manual, a means is provided for rapidly discharging a precise amount from a storage bin whereby over-shooting the amount is practically eliminated.

Referring now to FIGS. 4 and 5 in which like elements have like reference numerals, another embodiment of this invention is shown. This embodiment comprises a gravity flow chute 10 depending from the bottom of conventional storage bin 12, a slide gate mechanism 14 operatively located intermediate the ends of chute 10, and a conventional vane feeder 90 which communicates with bin 12 and discharges adjacent chute 10, thereby providing a bypass of gate mechanism 14.

The neck portion 92 of chute 10 is similarly constructed and connected to a bin 12 as is chute 10 in the first embodiment of this invention. Portion 92 has an upper opening 32 which is made coextensive with the discharge opening of bin 12 and aligned therewith when chute 10 is connected to bin 12. In this second embodiment, however, the portion 98 of chute 10 is divided into two conduit branches 94 and 96. Branches 94 and 96 have separate discharge openings 34a and 34b, respectively.

Slide gate mechanism 14 is mounted in branch 96 and utilizes guide bars 46 attached to the interior facing surfaces thereof. A gate in the form of a flat plate 48 is mounted on bars 46 for horizontal sliding movement. Extending horizontally from branch 96 are two parallel channel members 40 which support on the facing surfaces thereof continuations of the bars 46. In this embodiment, the remainder of the mechanism 14 is the same as that already described in connection with FIGS. 1 and 2. The gate 48 is operated horizontally the same as previously explained for opening and closing branch 96.

Disposed below chute 10 is a conventional vane feeder 90 composed of a rotor 100 having a plurality of radial blades or teeth 102 which revolve between two parallel plates 91 and 93, respectively. Rotor 100 is revolved around pivot 104 by means of a conventional variable speed motor 106. An opening 108 in the flange 114 of the vane feeder 90 is coextensive and aligned with the discharge opening 34a of branch 94, and a conduit 110 fitted to and passing through the flange 114 and plate 93 is coextensive and aligned with the discharge opening 34b of branch 96. Conduit 110 forms an extension of branch 96 permitting flow from branch 96 through and between the vanes 102 and past the rotor 100. Therefore, contents of bin 12 can pass either through branch 96, past slide gate mechanism 14, and out of discharge opening 112 thereby bypassing the vane feeder 90; or in the alternative, they may pass through branch conduit 94 into the space between vanes 102 and onto bottom plate 93. Rotation of the rotor 100 moves the material contained between the vanes 102 one hundred eighty degrees depositing it into conduit 110 from which it discharges. Securing vane feeder 90 to chute 10 may be achieved by various methods, one of which being two annular flanges 114 and 115 on branches 94, 96 and vane feeder 90, respectively, which are secured together by bolts 116.

In operation the embodiment of FIGS. 4 and 5 makes possible the rapid discharge of a highly accurate, measured weight or volume of material from bin 12. Similarly to the embodiment of FIGS. 1, 2 and 3, this second embodiment provides a unique combination of a rapid discharge mechanism and a relatively slow, continuous and measurable discharge mechanism. In this second embodiment, whenever bin 12 is loaded, the contents thereof completely fill the branch 96 above the gate mechanism 14 and the branch 94 down to the bottom plate 102. By moving gate 48 horizontally out of registry with a portion of the opening 34b the contents of branch conduit 96 can gravitate into the lower portion of branch 96 past the vanes 102 and into conduit 110. Slide gate 48 may be horizontally slid to any one of the intermediate, controlled-flow positions or to the fully open position as previously described. By proper design of chute 10, slide-gate mechanism 14 permits the rapid discharge of bin 12 through opening 34b and conduit 110.

Vane feeder 90 permits the controlled, slow discharge of material from the branch 94 to the conduit 110. Thus, by discrete operation of the gate mechanism 14 and the vane feeder 90, rapid dispersing of material may be followed by metered discharge in order to obtain, in minimum time, the precise quantity of material desired. Low flow rates can be obtained by merely rotating rotor 100 at a correspondingly slow rate. By means of a conventional variable speed, low horse-power motor 106, rotor 100 can be adjustably rotated at various speeds corresponding to the discharge rate desired.

For a typical dispensing operation, gate 48 is fully opened until an amount of material just short of that desired is obtained. At this point, slide gate 48 is closed and vane feeder 90 is rotated to discharge material into conduit 110 at a rate much slower than that just previously obtained from branch 96. The moment the desired quantity of material has been dispensed, the rotor is stopped thereby terminating the discharge. Thus, it is possible to obtain, in minimum time, precisely the quantity of material desired.

With reference to the arrangement of FIGS. 1 and 2, the inclination of conveyor 16 serves two useful purposes. First, it resists and stops gravitating flow from chute 10 through casing 70, because the granular, flowable material which is being dispersed will not flow uphill (as will liquids under similar conditions). The inclination of the conveyor 16 is at an angle that prevents gravitational flow of material uphill and out of end 82. Secondly, the screw 74 can be made shorter in view of the fact that a horizontal position for conveyor 16 would permit some horizontal flow of material and the conveyor would have to be made longer and long enough to impart sufficient resistance to stop such flow.

While I have illustrated and described specific embodiments of this invention, further modifications and improvements will occur to those skilled in the art and I desire therefore in the appended claims to cover all modifications which do not depart from the spirit and scope of my invention.

What is claimed is:

1. A bin unloading device comprising a chamber of generally rectangular cross-section having four upstanding sides and upper and lower ends which are open, a rectangular frame having spaced apart side members and oppositely disposed end members, said side members having facing surfaces, said chamber being rigidly mounted on said frame with said lower end being disposed adjacent to one of said end members and between said side members, said frame extending beyond said chamber in a direction transverse to a line passing through said ends, a pair of elongated bars secured to the facing surfaces of said side members in parallelism therewith, said elongated bars being spaced apart and parallel, a plate member slidably mounted on said bars and being movable into and out of registry with said lower open end, said plate member being of a size which completely closes the opening in said lower end when said plate member is moved into registry therewith, a double-acting power cylinder mounted on the other of said end members, said power cylinder having a piston rod connected at its distal end to said plate member for selectively moving the latter into and out of closing relationship with said open lower end, an elongated tubular housing mounted on said chamber and inclining upwardly from the region of said open lower end, said housing having opposite upper and lower ends, said housing passing through said chamber and extending therebeyond so as to have a portion disposed within said chamber and another portion disposed without, the lower end of said housing being disposed adjacent to one side of said chamber, the wall of said housing being spaced from the sides of said chamber thereby providing a passage through said chamber between the upper and lower ends thereof, the portion of said housing within said chamber having a part-cylindrical opening in the upper side thereof which extends from said one side of said chamber to an opposite side, a conveyor screw coaxially rotatably mounted within said housing and extending from one end to the other of the latter, means for rotating said screw, the upper end portion of said housing being provided with a discharge opening in the underside thereof, an upright discharge conduit connected at one end to the upper end portion of said housing in registry with said discharge opening, said conduit having a lower end portion secured to and disposed inside of said frame, said lower end portion also being spaced from the lower end of said chamber whereby material may be conveyed by said screw from said chamber and deposited into said discharge conduit from which it may gravitate through said lower end portion.

2. A bin unloading device comprising a chamber of generally rectangular cross-section having four upstanding sides and upper and lower ends which are open, a rectangular frame having spaced apart side members and oppositely disposed end members, said side members having facing surfaces, said chamber being rigidly mounted on said frame with said lower end being disposed adjacent to one of said end members and between said side members, said frame extending beyond said chamber in a direction transverse to a line passing through said ends, a pair of elongated bars secured to the facing surfaces of said side members in parallelism therewith, said elongated bars being spaced apart and parallel, a plate member slidably mounted on said bars and being movable into and out of registry with said lower open end, said plate member being of a size which completely closes the opening in said lower end when said plate member is moved into registry therewith, a double-acting power cylinder mounted on the other of said end members, said power cylinder having a piston rod connected at its distal end to said plate member for selectively moving the latter into and out of closing relationship with said open lower end, an elongated tubular housing mounted on said chamber and inclining upwardly from the region of said open lower end, said housing having opposite upper and lower ends, said housing passing through said chamber and extending therebeyond so as to have a portion disposed within said chamber and another portion disposed without, the lower end of said housing being disposed adjacent to one side of said chamber, the wall of said housing being spaced from the sides of said chamber thereby providing a passage through said chamber between the upper and lower ends thereof, the portion of said housing within said chamber having an opening in the upper side thereof, a conveyor screw coaxially rotatably mounted within said housing and extending from one end to the other of the latter, means for rotating said screw, the upper end portion of said housing being provided with a discharge opening in the underside thereof, an upright discharge conduit connected at one end to the upper end portion of said housing in registry with said discharge opening, said conduit having a lower end portion spaced from the lower end of said chamber whereby material may be conveyed by said screw from said chamber and deposited into said discharge conduit from which it may gravitate through said lower end portion.

3. A bin unloading device comprising a chamber of generally rectangular cross-section having four upstanding sides and upper and lower ends which are open, a rectangular frame having spaced apart side members and oppositely disposed end members, said side members having facing surfaces, said chamber being rigidly mounted on said frame with said lower end being disposed adjacent to one of said end members and between said side members, said frame extending beyond said chamber in a direction transverse to a line passing through said ends, a pair of elongated bars secured to the facing surfaces of said side members in parallelism therewith, said elongated bars being spaced apart and parallel, a plate member slidably mounted on said bars and being movable into and out of registry with said lower open end, said plate member being of a size which completely closes the opening in said lower end when said plate member is moved into registry therewith, means for selectively moving said plate member into and out of closing relationship with said lower open end of said chamber, an elongated tubular housing mounted on said chamber and inclining upwardly from the region of said open lower end, said housing having opposite upper and lower ends, said housing passing through said chamber and extending therebeyond so as to have a portion disposed within said chamber and another portion disposed without, the lower end of said housing being disposed adjacent to one side of said chamber, the wall of said housing being spaced from the sides of said chamber thereby providing a passage through said chamber between the upper and lower ends thereof, the portion of said housing within said chamber having an opening in the upper side thereof, a conveyor screw coaxially rotatably mounted within said housing and extending from one end to the other of the latter, means for rotating said screw, the upper end portion of said housing being provided with a discharge opening in the underside thereof, an upright discharge conduit connected at one end to the upper end portion of said housing in registry with said discharge opening, said conduit having a lower end portion spaced from the lower end of said chamber whereby material may be conveyed by said screw from said chamber and deposited into said discharge conduit from which it may gravitate through said lower end portion.

4. A bin unloading device comprising a chamber having upstanding sides and upper and lower ends which are open, valve means for selectively opening and closing said lower open end, an elongated tubular housing mounted on said chamber and inclining upwardly from the region of said open lower end, said housing having opposite upper and lower ends, said housing passing through said chamber and extending therebeyond so as to have a portion disposed within said chamber and another portion disposed without, the lower end of said housing being disposed adjacent to one side of said chamber, the wall of said housing being spaced from the sides of said chamber thereby providing a passage through said chamber between the upper and lower ends thereof, the portion of said housing within said chamber having an opening in the upper side thereof, a conveyor screw coaxially rotatably mounted within said housing and extending from one end to the other of the latter, means for rotating said screw, the upper end portion of said housing being provided with a discharge opening in the underside thereof, an upright discharge conduit connected at one end to the upper end portion of said housing in registry with said discharge opening, said conduit having a lower end portion spaced from the lower end of said chamber whereby material may be conveyed by said screw from said chamber and deposited into said discharge conduit from which it may gravitate through said lower end portion.

5. A bin unloading device comprising a chamber having upstanding sides and upper and lower ends which are open, slide valve means movable across said lower open end for selectively opening and closing said lower open end, means for operating said valve means, conveyor means mounted on said chamber and having an entrance opening and an exit opening, said conveyor means extending from within said chamber and through one of said sides of said chamber, said entrance opening being within said chamber between said valve means and said upper open end and being exposed to said upper open end of said chamber, said exit opening being disposed exterior to said chamber and above said entrance opening, means for operating said conveyor means whereby material may be transported by said conveyor means from within said chamber and through said exit opening to a position which is exterior to said chamber and is spaced from said lower open end of said chamber thereby bypassing said valve means.

6. A bin unloading device comprising a chamber having upstanding sides and upper and lower ends which are open; slide valve means movable across said lower open end for selectively opening and closing said lower open end; means for operating said valve means, means for conveying material from said chamber to a position exterior to said chamber and above said lower end, said conveying means being mounted on said chamber and including an upwardly inclined hollow element having opposite ends, one of said element ends being in communication with said chamber between said valve means and said upper open end, the other of said element ends being open and exterior to said chamber and above said lower end, the inclination of said hollow element being such as to prevent gravitational flow of material therethrough from said chamber and out of the other of said element ends.

7. A bin unloading device comprising a chamber having upper and lower open ends through which material may flow, first valve means for controlling gravitational flow of material through said chamber and out of said lower end, and second means for directing material in metered quantities upwardly from the region of said lower end of said chamber whereby rapid flow of material through said chamber may be effected by operation of said first means and slower flow of material from said chamber may be effected by operation of said second means, said second means including upwardly inclined conduit means outside said chamber and having entrance and discharge ends, said entrance end being lower than said discharge end and communicating with the lower internal portion of said chamber, the angle of inclination of said conduit means being such as to prevent gravitational flow of material from said chamber through said conduit means and out of said conduit means discharge end.

8. A bin unloading device comprising a gravity-flow-conducting device having upper and lower open ends through which a gravity flow of material may be directed, valve means for selectively controlling said gravity flow, said valve means being mounted on said gravity-flow-conducting device means for operating said valve means between a "no-flow" position and an unrestricted flow position, said valve means including a gate slidable in a direction transverse to the direction of said gravity flow, a metered-flow-conducting device having an entrance, an exit and variable means operable for selectively controlling flow of material therethrough, said entrance communicating with said gravity-flow-conducting device between said upper open end and said valve means, said metered-flow-conducting device including means for elevating material from the vicinity of said lower end to a higher position, whereby a relatively rapid flow of material through said gravity-flow-conducting device may be effected by operating said valve means and a relatively slow metered flow of material through said metered-flow-conducting device and through said exit may be effected by operating said variable means.

References Cited by the Examiner

UNITED STATES PATENTS

| 400,720 | 4/1889 | Wheatley | 222—331 |
| 1,498,459 | 6/1924 | Lang | 222—330 X |
| 1,514,330 | 11/1924 | Neal et al. | 222—330 X |
| 2,217,103 | 10/1940 | Cooke | 222—331 |
| 2,639,076 | 5/1953 | Kerr | 222—331 |
| 2,736,461 | 2/1956 | Dueringer et al. | 222—1 |
| 2,918,199 | 12/1959 | Marrafino | 222—1 |

FOREIGN PATENTS

| 607,689 | 11/1960 | Canada. |
| 38,905 | 3/1887 | Germany. |
| 331,027 | 12/1920 | Germany. |
| 72,144 | 4/1916 | Switzerland. |

RAPHAEL M. LUPO, *Primary Examiner.*